United States Patent [19]

Greeson et al.

[11] Patent Number: 4,633,404
[45] Date of Patent: Dec. 30, 1986

[54] AUTOMATIC DECELERATION OF AIRCRAFT DURING DESCENT

[75] Inventors: Jeffrey A. Greeson; Terry L. Zweifel, both of Phoenix, Ariz.

[73] Assignee: Sperry Corporation, New York, N.Y.

[21] Appl. No.: 496,767

[22] Filed: May 20, 1983

[51] Int. Cl.$^4$ .............. G06F 15/48; G06F 15/50; G06G 7/70; G06G 7/76

[52] U.S. Cl. .................. 364/433; 364/430; 364/431.07; 364/428; 364/426; 244/180; 318/583; 318/584

[58] Field of Search .............. 244/180, 181, 182, 183; 318/583, 584; 73/178 T, 178 H; 364/433, 430, 431.07, 428, 426, 436; 340/968

[56] References Cited

U.S. PATENT DOCUMENTS

| | | | |
|---|---|---|---|
| 3,007,656 | 11/1961 | Miller et al. | 244/180 |
| 3,279,724 | 10/1966 | Miller | 364/430 |
| 3,868,497 | 2/1975 | Vietor | 364/430 |
| 4,021,009 | 5/1977 | Baker et al. | 364/433 |
| 4,114,842 | 9/1978 | Hofferber et al. | 364/433 |
| 4,357,663 | 11/1982 | Robbins et al. | 364/433 |
| 4,377,848 | 3/1983 | Flannigan et al. | 244/180 |

Primary Examiner—John W. Caldwell, Sr.
Assistant Examiner—Donna L. Angotti
Attorney, Agent, or Firm—Howard P. Terry

[57] ABSTRACT

Deceleration control apparatus for an aircraft having an automatic altitude capture and hold system and an airspeed hold system, both systems controlled by controlling pitch attitude wherein during a descent from a higher altitude under airspeed-on-pitch control with throttle set at idle thrust, and at some existing negative altitude rate, a slower speed is commanded, a synthetic altitude based on the existing descent rate is computed and the attitude capture and hold system operation is switched into control in place of the airspeed on pitch control to cause the aircraft to flare toward the synthetic altitude. The resultant loss of airspeed, i.e., craft deceleration, during the altitude capture flare is monitored and when the commanded airspeed reduction is achieved, the airspeed-on-pitch control is resumed to thereby hold the commanded lower airspeed.

12 Claims, 5 Drawing Figures

AUTOMATIC DECELERATION OF AIRCRAFT DURING DESCENT

BACKGROUND OF THE INVENTION

1. Field of the Invention

The present invention relates generally to aircraft automatic flight control systems and more specifically to speed control and deceleration to a lower speed during the descent portion of flight from a cruising altitude. The present invention may be incorporated in an aircraft performance management system (PMS) which is fully coupled to the aircraft automatic pilot system.

2. Description of the Prior Art

Most commercial transport aircraft, general aviation aircraft and military aircraft are equipped with an automatic flight control system and many also include a separate performance management system for controlling the vertical flight path profile in the most efficient and economical manner, the PMS preferably being fully coupled to the aircraft's autopilot system. Such systems generally provide the human pilot with the capability of altering the flight path of the aircraft to achieve and maintain a desired speed, measured either in knots or Mach number.

During a descent from a cruising altitude, the pilot may elect to decrease the speed of the aircraft through a manually-entered speed command or the pilot may be mandated by Air Traffic Control (ATC) to decelerate to a specified speed and a specified altitude in order to maintain air traffic separation and the like. In addition, in the United States, the Federal Aviation Administration (FAA) requires that an aircraft's speed be no greater than 250 knots indicated airspeed at altitudes less than 10,000 feet. Thus the human pilot is generally required to decelerate the aircraft in a number of successive steps as the aircraft descends from a cruise altitude toward the airport at which a landing is intended.

In the prior art, these decelerations were generally accomplished by increasing the pitch attitude of the aircraft in a manner proportional to the difference between the new speed command and the actual speed of the aircraft, or speed error. While this scheme will decelerate the aircraft to the desired Mach or airspeed, there is no assurance this will be done in a timely or optimal manner or that any altitude restrictions imposed by either Air Traffic Control or the Federal Aviation Administration will be met. Another of the prior art systems is described in present assignee's U.S. Pat. No. 4,021,009 entitled "Vertical Path Control for Aircraft Air Navigation Systems" dated May 3, 1977. In this system, the deceleration of the aircraft in the descent phase of flight is accomplished by the computation of a flight path angle used to manipulate the actual vertical path of the aircraft for the achievement of a specified waypoint. Such a system suffers from relatively long deceleration times beginning at relatively high altitudes above the desired point where the newly commanded speed is to be achieved. Hence, the deceleration is neither optimal nor timely, particularly in the aircraft terminal area where precise and rapid speed control is necessary owing to constraints imposed by air traffic control. An additional prior art system is described in present assignee's U.S. Pat. No. 3,196,688, entitled "VTOL Craft Deceleration Control System", dated Nov. 4, 1975. This system, as the title emphasizes, is specifically designed for VTOL (Vertical Takeoff and Landing) aircraft and is specifically concerned with the deceleration of the aircraft as it approaches its final touchdown point. Hence, it does not address the problem of the deceleration of aircraft at high altitudes nor the achievement of the required 250 knot speed restriction at 10,000 feet of altitude. Furthermore, the method of decelerating the aircraft relies on the prescheduling of the time rate of change of the newly commanded speed, i.e., mach or airspeed rate. Such a system necessarily presupposes that the actual airspeed of the aircraft will follow exactly the predetermined rate. In fact, this is often not the case because of the effects of atmospheric turbulence, system tolerances and errors, and the like.

The present invention overcomes the shortcomings of the prior art by computing an altitude based upon the existing descent rate, or altitude rate of the aircraft, which computation is used to tend to level the aircraft with the engine (s) at idle thrust until the difference between the desired speed and the actual speed of the aircraft is within a predetermined amount, at which time conventional speed control proportional to speed error is resumed.

SUMMARY OF THE INVENTION

The present invention provides means for automatic, optimal deceleration of an aircraft to a selected or commanded speed slower than the actual speed during the descent portion of flight by the capture of a computed or synthetic altitude based on the actual descent altitude rate of the aircraft. Means are further provided to automatically command a slower speed, based on pilot-entered or PMS stored data, such that the commanded speed will be achieved at a specified altitude. Optimal deceleration may thus be achieved either with specified altitude requirements or in the absence of such requirements.

DESCRIPTION OF THE PREFERRED EMBODIMENTS

The present invention is useful in any automatic flight control system or in any performance management system (PMS) that is fully coupled to an automatic flight control system, and provides apparatus for automatically transitioning the aircraft to a slower commanded speed in the descent portion of the flight. In either system, it is often desirable for the human pilot to decrease the speed of the aircraft to achieve a particular speed and altitude at specified geographical location known as a crossing-point. In fact, Air Traffic Control may mandate via radio communication with the pilot that the aircraft is to be at the above conditions in order that air traffic separation may be maintained. Furthermore, the pilot may elect to decrease the speed of the aircraft to maintain the correct descent profile in cases where a headwind has caused the aircraft to descend below a desired path, or the pilot may elect to decrease the aircraft's speed in order to deploy flaps or landing gear in preparation for landing.

Figure 1:
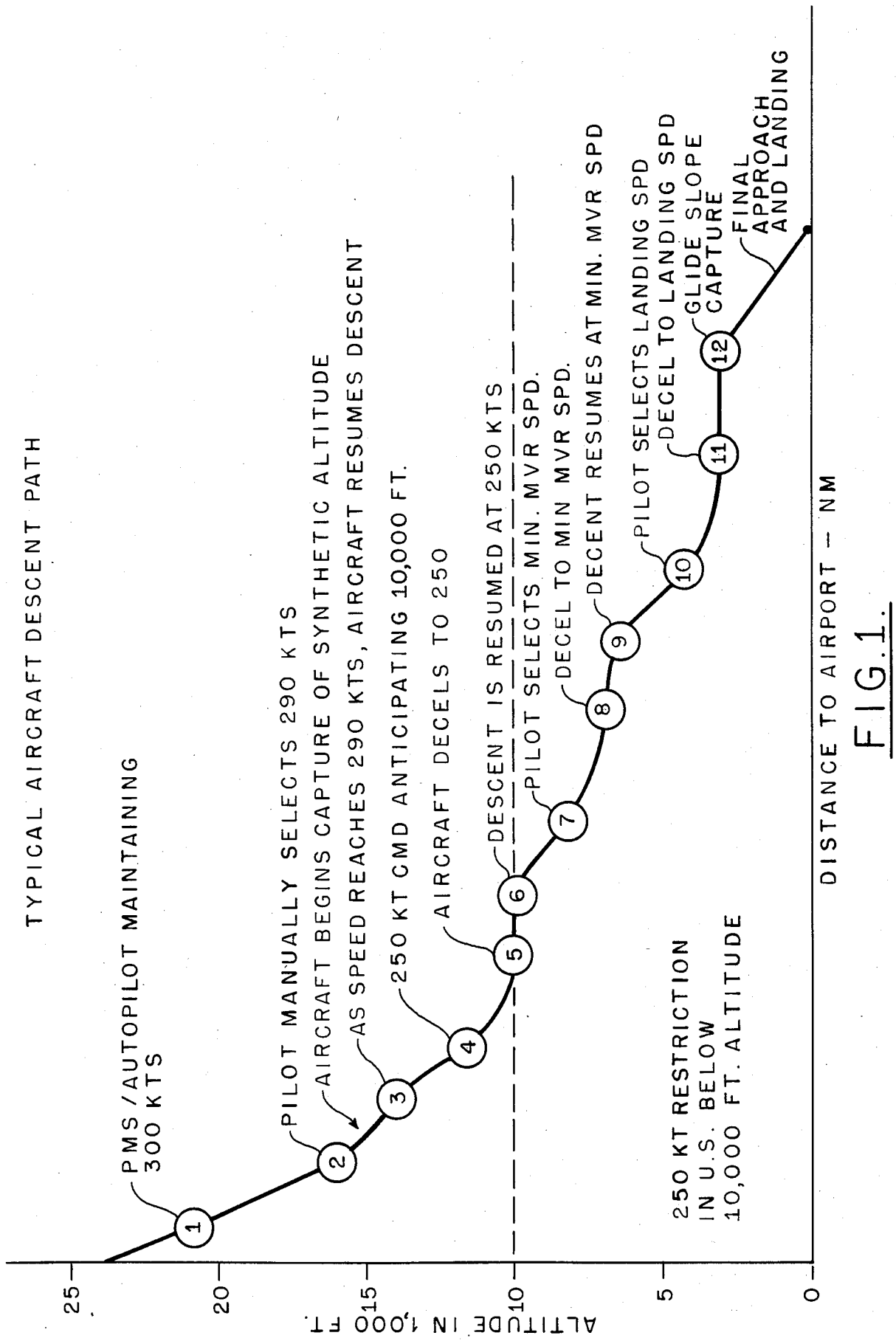
FIG. 1 is a graph of altitude versus distance of a typical aircraft descent profile from a cruise altitude to an approach and landing showing some of the successive speed changes involving the present invention.

Referring now to FIG. 1, a typical descent path for a typical commercial transport aircraft is illustrated. At point 1 the aircraft has already started its descent from its cruise altitude and the PMS or autopilot is maintaining its commanded initial descent speed of 300 kts. which speed is maintained using conventional speed error-on-pitch control. At point 2 the pilot, through the PMS keyboard selects a new speed of 290 kts. which is slightly below the initial 300 kt. speed. It will be understood that this new speed may be automatically commanded by the PMS preprogrammed descent profile and that the point 2 may be, for example, a descent path crossover point which requires a 10 kt. speed reduction. In either case, the present invention switches out the conventional speed error-on-pitch control and substitutes its novel deceleration control to decelerate the aircraft to the commanded 290 kts. After the commanded speed is achieved, the conventional speed control is switched back in. As the aircraft descends toward 10,000 feet FAA regulations require the aircraft to be decelerated to 250 kts. at this altitude. Thus, at point 4 the present invention again decelerates the aircraft to the required speed and when it has been achieved, as at 6, the descent continues under conventional speed control. At points 7 and 10 further decelerations are commanded and at each point the present invention is used to achieve the commanded speed in an optimum manner. Thus, the present invention is useful whenever a deceleration from a higher speed to a lower speed is commanded either by pilot entry or by stored PMS program. Also, the present invention is useful in decelerating the aircraft to a specific speed which must be achieved at a specified altitude such as a cross-over point or other navigation way point.

Figure 2:
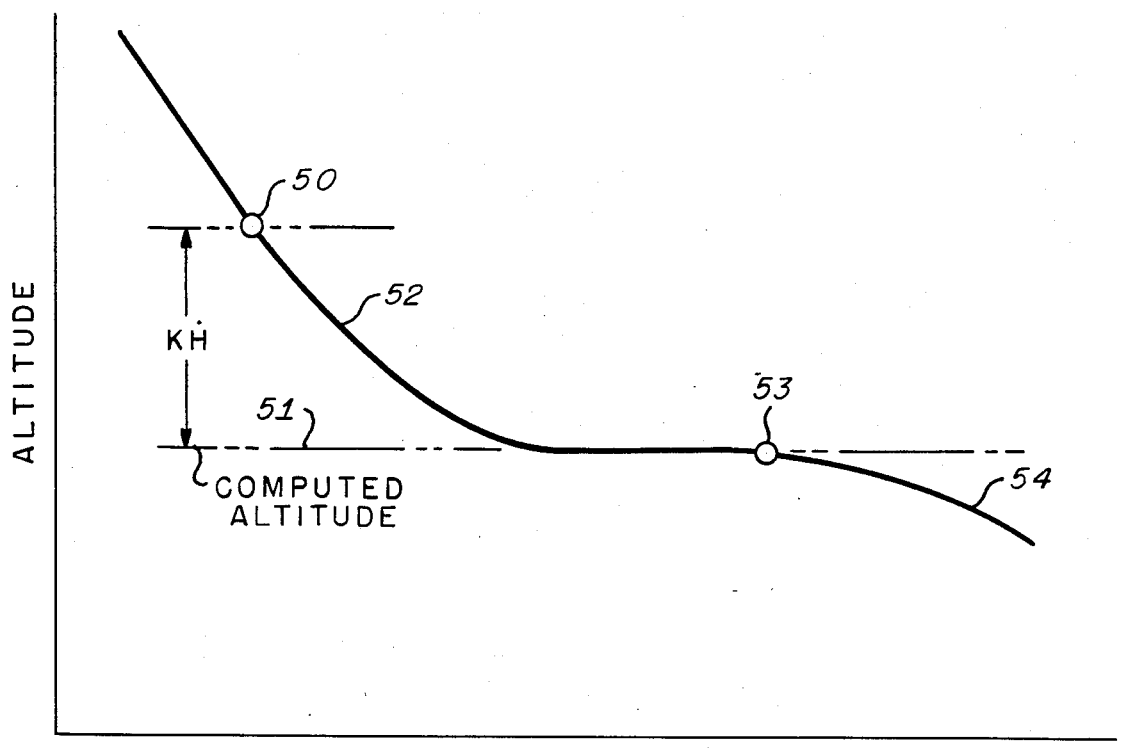
FIG. 2 is a graph of altitude versus distance illustrating the descent flight path generated by the present invention to decelerate to a commanded speed which is significantly less than the actual speed of the aircraft, such as between points 4 and 6 of FIG. 1.

The implementation and operation of the present invention will now be described, referring first to FIG. 2 which illustrates a commanded deceleration of a relatively large magnitude. Also, in the following description of the invention, it will be assumed that the engine thrust will remain constant, for example, the throttles will be set and maintained at idle thrust. Assume the aircraft is descending at an altitude above 10,000 feet and that no deceleration of the aircraft has been commanded. The aircraft will be descending at some existing rate of descent or altitude rate H. Now assume that the aircraft is to be decelerated by either a pilot-entered or a PMS commanded speed which is significantly less than the existing speed of the aircraft and that the speed command occurs at point 50. A computed altitude 51 which will be used by the autopilot or PMS is determined by the relationship:

$$Hs = H + K\dot{H} \tag{1}$$

Where
- $Hs$ = the computed altitude in feet.
- $H$ = the actual altitude of the aircraft in feet.
- $K$ = a characterizing parameter that determines the shape of the capture flight path. This characterizing parameter may be of the form described in assignee's pending U.S. Pat. Application Ser. No. 476,090.
- $\dot{H}$ = the present altitude rate of the aircraft in feet per second.

It will be noted that the computed altitude $Hs$ will always be $K\dot{H}$ feet below the actual altitude of the aircraft according to equation 1 above.

The automatic flight control system or PMS will then command the elevator or horizontal stabilizer in such a fashion as to alter the flight path of the aircraft along line segment 52 according to the well known altitude capture control law:

$$He - K\dot{H} = 0 \tag{2}$$

Where
- $He$ = altitude error in feet between the computed altitude and the actual altitude.
- $K$ = a characterizing parameter as defined above.
- $\dot{H}$ = the actual altitude rate in feet per second (rate of descent).

The pitch command in accordance with equation 2 will of course tend to decelerate the aircraft (since the throttles are at idle thrust) towards the commanded speed. Since the speed error is relatively large it is probable that the aircraft will reach the commanded or synthetic altitude before the commanded speed is reached in which case, the synthetic altitude will be maintained during which time the aircraft will continue to decelerate unitl the new speed has dropped to within a predetermined threshold value of the new commanded speed, for example 0.01M. This event is shown at point 53 in FIG. 2 and in accordance with the invention the altitude capture control law of equation 2 used as an optimum deceleration control, is switched out and the conventional airspeed error-on-pitch control law reinstated to maintain the newly achieved speed as the aircraft continues its descent along line segment 54.

Figure 3:
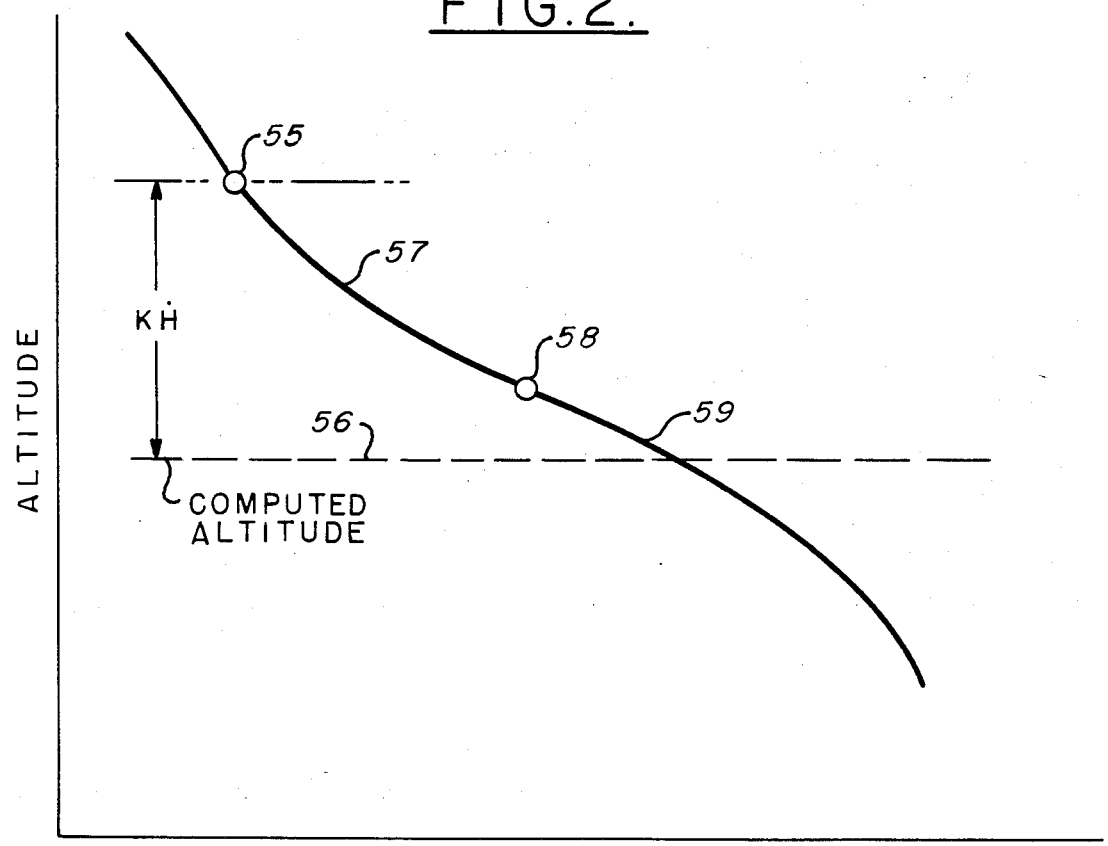
FIG. 3 is a graph of altitude versus distance illustrating the descent flight path generated by the present invention when the commanded speed is only slightly less than the actual speed of the aircraft, such as between points 2 and 4 of FIG. 1.

During the normal descent from cruise altitude, there will undoubtedly be some speed changes commanded which are only slightly less than the existing speed. FIG. 3 illustrates the resulting flight path for such a small speed change using the present invention.

Assume that the newly commanded speed is only slightly less than the present speed of the aircraft, but the difference is greater than some predetermined threshold amount, for example 0.005 Mach. Further assume that the new speed command occurs at point 55. As in the above example, the present invention will compute a synthetic altitude 56 that is $K\dot{H}$ below the actual altitude of the aircraft and the altitude capture control law expressed by equation 2 will be switched into control in place of the conventional speed control law. As the aircraft begins the capture of the computed altitude along line segment 57, it will inherently begin to decelerate toward the new commanded speed (since throttles are at idle thrust). When the actual speed is within some predetermined threshold amount of the commanded speed such as the above 0.005, represented by point 58, the capture of the computed altitude is abandoned, that is, is switched out of control, and conventional speed control is resumed as the aircraft continues its descent along line segment 59. Thus, it will be noted that the synthetic or computed altitude is not even captured due to the achieving of the commanded speed during the synthetic altitude capture flare maneuver.

In the often experienced case where Air Traffic Control has required that the aircraft be at a speed less than the present speed of the aircrft and be at a specific altitude, the pilot will enter the required speed and altitude, either by analog selector dials or through a digital computer keyboard as in a PMS. The entries are used to determine the specific altitude at which the maneuver to the required slower speed is to be initiated according to the equation:

$$Hc = Hr - K\dot{H} \qquad (3)$$

Where
Hc=the altitude in feet at which the required speed change is to be initiated.
Hr=the required altitude in feet at which the aircraft must be at the required speed.
K=the characterizing parameter previously described.
$\dot{H}$=the actual descent rate of the aircraft in feet per second.

By way of example, assume ATC has informed the pilot to decelerate the aircraft to 250 knots indicated airspeed at 15,000 feet and assume the aircraft is presently descending at 300 knots indicated airspeed and 50 feet per second at an initial altitude of 20,000 feet. The pilot would therefore enter the required speed, 250 knots, and altitude, 15,000 feet, as described. Assuming for simplicity of explanation that the descent rate of the aircraft is maintained at a constant 50 feet per second and that the value of K is held constant at a value of 15, equation 3 above would cause the automatic command of the required speed at an altitude of 15,750. This automatic command of the slower speed will result in the computation of a capture altitude by equation 1 above and the result would be (15,750−750) or 15,000 feet. The altitude capture control law, equation 2 will therafter be used to capture 15,000 feet and the aircraft will have decelerated to the required 250 knots indicated airspeed. Once having achieved the commanded speed within the above threshold of 0.01M, the altitude capture control law described above is severed from control of the aircraft speed and conventional proportional speed control will take over.

To comply with the FAA regulation that the aircraft's speed shall not exceed 250 knots indicated airspeed below 10,000 feet altitude, the speed and altitude requirement is either entered by the pilot or stored within the PMS memory for automatic recall as required. As the aircrft descends toward 10,000 feet, the altitude at which 250 knots is commanded and the computation of the altitude to be captured (i.e. 10,000 feet) occurs in the same fashion illustrated by the above example.

The present invention may be implemented by using conventional analog circuitry and computational techniques or by using conventional wholly digital techniques or by using conventional hybrid digital/analog techniques all of which are well known and readily practiced by those skilled in the present art. To simplify the understanding of the invention, it will be explained by using a generally analog format as shown in FIG. 4, it being understood that the same analog format may also represent, in block diagram form, the program of a programmable digital computer wherein the various analog inputs are converted to digital signals for digital processing and the various outputs are converted to analog signals for driving the control surface servomotors and the like.

Figure 4:
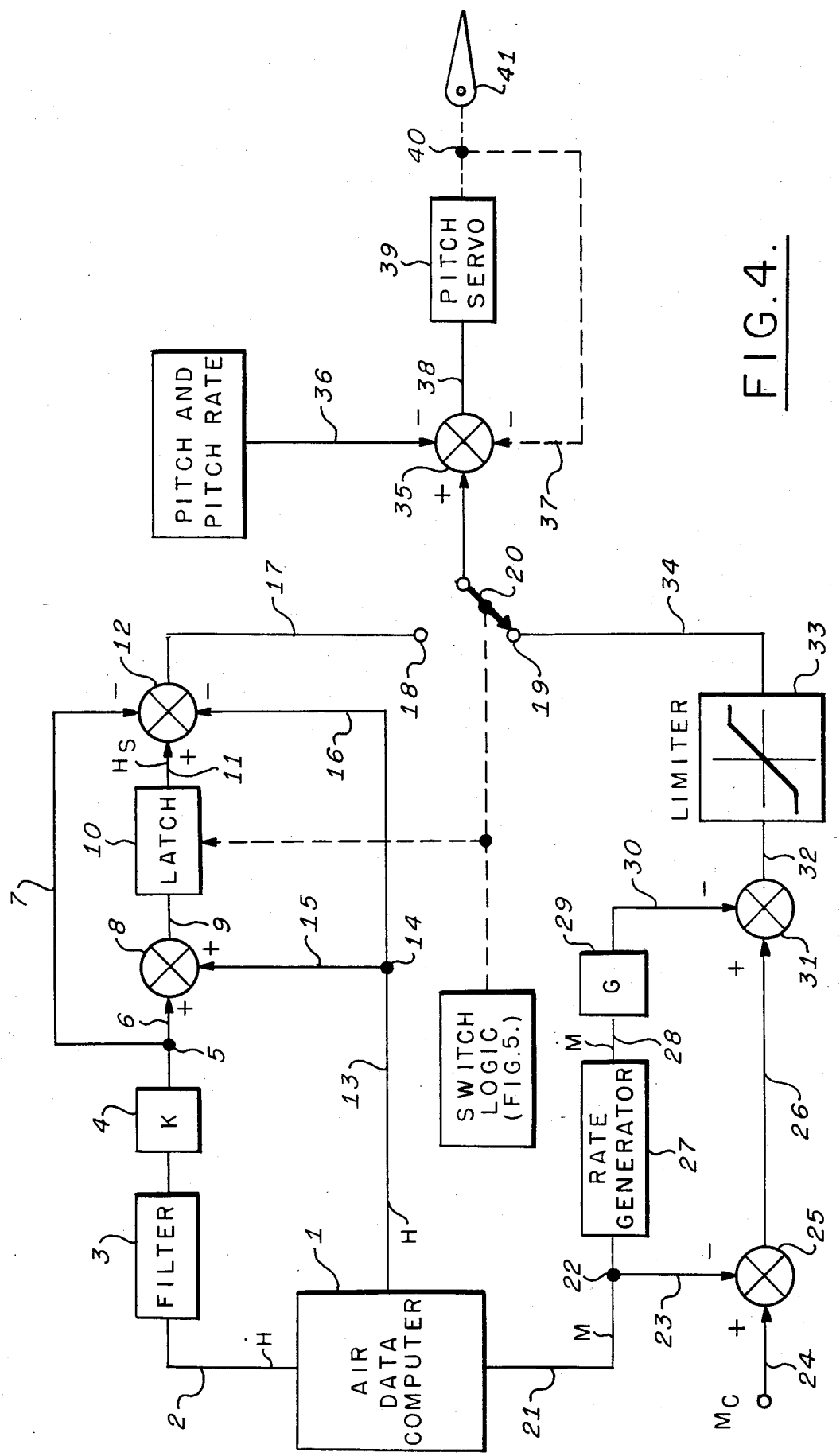
FIG. 4 is a block diagram of the present invention showing how the computed altitude is calculated and how pitch control is switched between conventional proportional speed error control and the control to capture of the computed altitude.

Referring to FIG. 4, assume the aircraft is descending through an altitude substantially higher than 10,000 feet and that no deceleration of the aircraft has been commanded. Switch blade 20 will be in the position shown, making contact with contact 19 in accordance with the logic diagram of FIG. 5 to be described below. A signal proportional to the actual Mach number of the aircraft is supplied by conventional air data computer 1 and appears on lead 21 and at junction 22. It is compared with a signal proportional to the commanded Mach number, Mc, which appears on lead 24 and is applied to conventional summation device 25. The actual Mach number from junction 22 appears on lead 23 where it is also applied to summation device 25. The output, which represents the difference between the commanded and actual Mach numbers, i.e. Mach error, appears on lead 26 and is applied to summation device 31. Simultaneously, the actual Mach number from junction 22 is applied to conventional rate generator or rate network 27 whose output appears on lead 28 and is a signal proportional to the time rate of change of actual Mach number or Mach rate. Mach rate is multiplied by an appropriate gain G, 29, and the result appears on lead 30 which is supplied to conventinal summation device 31. The output of summation device 31, appearing on lead 32, will be the wellknown proportional plus rate control of Mach number. Lead 32 supplies limiter 33, whose characteristic is illustrated graphically. Limiter 33 is a conventional limiter whose function is to assure the resultant pitch and pitch rate of the aircraft will be maintained within specified limits. The output of limiter 33 appears on lead 34 and at switch contact 19. This signal is applied to conventional summation device 35 via switch blade 20. Signals proportional to the pitch attitude angle and pitch rate of the aircrft are supplied to summation device 35 via lead 36 in the conventional manner. The output signal of summation device 35 is applied to servomotor 39 which, through the mechanical linkage 40, moves the aircrft's elevator or horizontal stabilizer, 41. Mechanical linkage 37 supplies summation device 35 with a signal proportional to elevator or horizontal stabilizer position so that the signal on lead 38 is reduced to null in the steady state condition.

Simultaneous with the action described above, air data computer 1 supplies a signal proportional to the altitude rate of the aircraft H on lead 2 to filter 3. Filter 3 is a conventional filter whose purpose is to eliminate or minimize atmospheric or electronic noise that may be present on the altitude rate signal. The output signal of filter 3 is supplied to gain block 4 where it is multiplied by a value K which may either be a constant or a variable number, as for example in the current assignee's pending application Ser. No. 476,090. The output signal of gain block 4 appears at junction 5 and represents the term K$\dot{H}$ in the above equations. One lead from junction 5 appears on lead 6 and thence to conventional summation device 8.

Air data computer 1 also conventionally supplies a signal porportional to the existing or actual altitude of the aircraft, H, on lead 13 and at junction 14. One lead 15, from junction 14 supplies the altitude signal to summation device 8 where it is algebraically added to the KḢ term explained above. The output fo the summation device 8 appears on lead 9 and represents the equation term H+KḢ. Lead 9 is supplied to Latch 10 which in the present case is synchronized such that its output on lead 11 is identical with its input signal on lead 9. It will be appreciated that latch 10 is effectively a clampable synchronizer which when unclamped follows its input signal and when clamped supplies an output corresponding to the last value of the input signal.

The KḢ term from junction 5 is supplied to conventional summation device 12 via lead 7. The actual altitude signal from junction 14 is also supplied to summation device 12 via lead 16. Thus, the output of the summation device 12 on lead 17 represents the term (KḢ+H)−(KḢ)−(H) which will, under the assumed condition, be at a null value.

Now assume that the human pilot elects to decelerate the aircraft to a new commanded speed by entering the speed through either an analog selector dial or through a computer display panel as in a PMS. If the difference between the newly commanded speed and the existing commanded speed exceeds a predetermined value, for example, 0.005 Mach, switch blade 20 through switching logic to be described below, will be moved to make contact with contact 18 and Latch 10 will be activated or latched. The value appearing on lead 9, which as explained before represents the term H+KḢ, at the instant switch blade moves to contact 18 will be stored and maintained on lead 11 regardless of subsequent changes in the value appearing on lead 9. The value of the signal on lead 11, therefore, represents a computed altitude Hs that will be captured in accordance with equation 1. The signal values appearing on leads 7 and 16 do vary with time and represent KḢ and H respectively. Thus, the output on lead 17 represents any error in the solution to the expression:

$$(H_s - H) - K\dot{H} = 0$$

This signal is applied to summation device 35 via contact 18 and switch blade 20 and is thence used by the autopilot to adjust the position of the aircraft's elevator or horizontal stabilizer in such a fashion as to reduce the error appearing on lead 17 to a null value. This action will cause either an asymptotic or circular flight path toward the computed altitude, Hs, depending on whether the value of K is a constant or a variable dependent on the actual altitude rate of the aircrft as taught in the above copending application.

As the aircraft pitch angle is increased during the capture or flare maneuver, the aircraft's speed will inherently decrease toward the newly selected value. When the difference between the actual speed of the aircraft and the commanded speed is less than some predetermined value, for example 0.01 Mach, switch blade 20 under logic control will make contact with contact 19, returning autopilot pitch control to the proportional plus rate control of speed described above. In addition, Latch 10 will return to its synchronization mode and the output on lead 17 will be a null value.

It is, of course, possible that the aircraft may not actually capture the computed altitude if the difference between the newly commanded Mach and the previous Mach command is small. During the increase in pitch angle of the capture maneuver, the aircraft may decelerate to within the predetermined value before it has levelled at the computed altitude. In such cases, a slight decrease in the rate of descent would occur as the aircraft decelerates.

Figure 5:
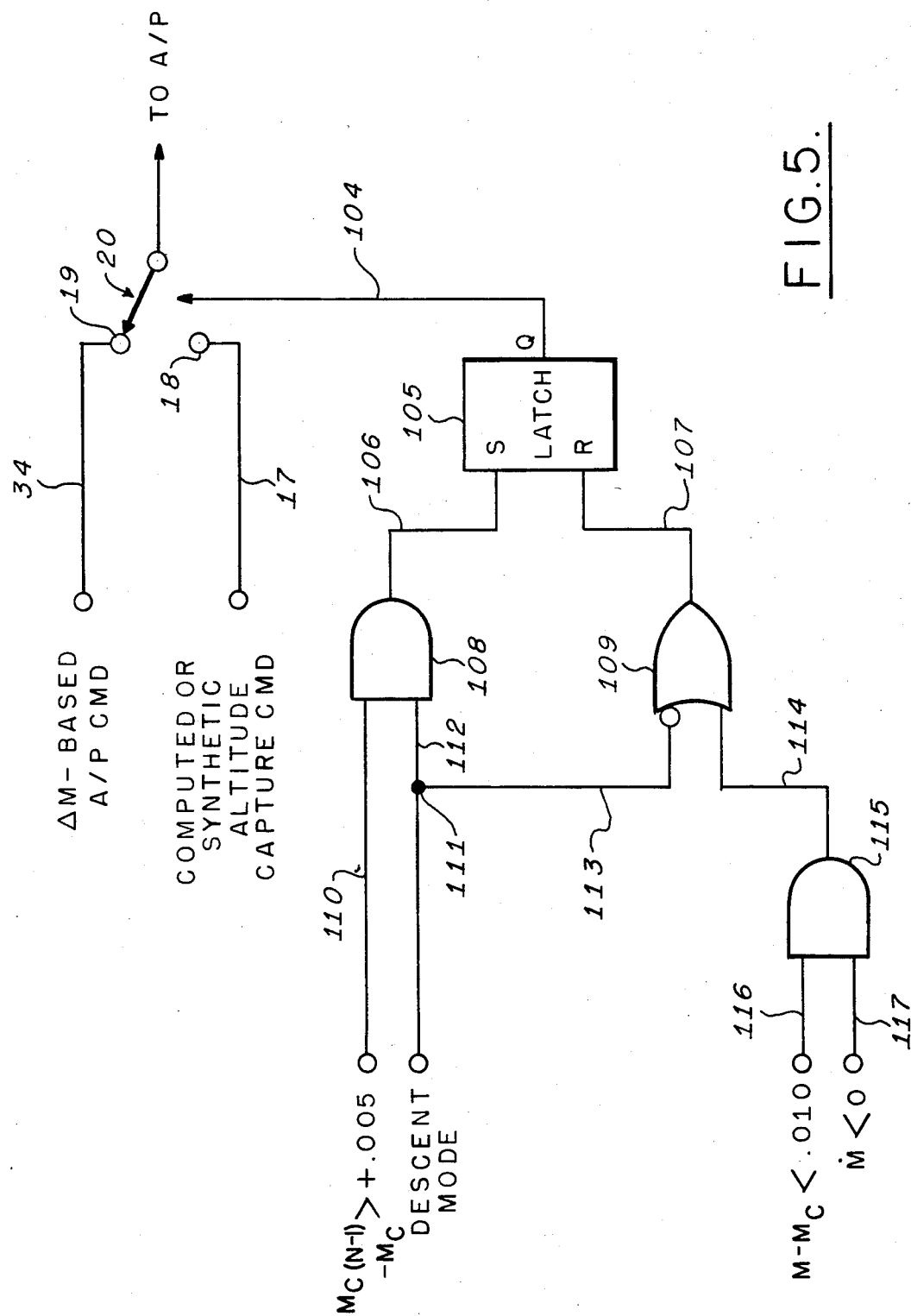
FIG. 5 is a logic diagram illustrating the various parameters used in the controlling of the transfer of speed control from conventional proportional airspeed-on-pitch to the altitude capture deceleration control of the present invention and vice versa.

Referring to the switch-over logic illustrated in FIG. 5, assume the aircraft is descending and that no deceleration of the aircraft has been commanded. Switch blade 20 will be in the position shown making contact with contact 19. A signal proportional to the error between the actual Mach of the aircraft and the commanded Mach number appears on lead 34 as described for FIG. 4. This signal is supplied to the automatic pilot via switch blade 20. The condition of being in a descent mode will supply a conventional logic "1" to terminal 111 and lead 112 which is one input to the conventional logic "AND" gate 108. Since no deceleration has been commanded, the difference between last commanded Mach number MC(N-1) and the presently commanded Mach number, MC, will be null or nearly null and less than a predetermined threshold level, for example 0.005M. This condition will supply a conventional logic "0" to lead 110 as the second input to the logic "AND" gate. The output of the "AND" gate in this condition will be a logic "0" on lead 106. Lead 106 supplies the set port of conventional set/reset Latch 105. A logic "0" on lead 106 will not cause Latch 105 to be set and the Q output port of Latch 105 will supply a logic "0" to lead 104. A logic "0" on lead 104 will cause switch blade 20 to be in the position shown in contact with contact 19.

Now assume a new commanded Mach number is entered such that the difference between the last commanded Mach number and the new commanded Mach number is greater than the predetermined threshold, for example 0.005M. This conditin will supply a logic "1" to lead 110 and consequently cause the output of logic "AND" gate 108 to output a logic "1" thus supplying a logic "1" on lead 106. A logic "1" on lead 106 will cause switch blade 20 to be moved to make contact with contact 18 and the synthetic altitude capture command signal on lead 17, as described in FIG. 3, will thence be supplied to the automatic pilot via switch blade 20.

When the difference between the actual Mach number, M, and the presently commanded Mach number, MC is less than a predetermined threshold value, for example 0.010M, a logic "1" will appear on lead 116 as one input to conventional logic "AND" gate 115. If the difference is above the threshold value a logic "0" will appear on lead 116. If the Mach rate of the aircraft is less than a predetermined value, for example, null, a logic "1" will appear on lead 117 as the second input to logic "AND" gate 115. If the Mach rate is above the threshold value a logic "0" will appear on lead 117. If and only if both leads 116 and 117 are at logic "1", the logic "AND" gate 115 will output a logic "1" to lead 114. Lead 114 is one input to conventional logic "OR" gate 109. The second input to logic "OR" gate 109 is lead 113 where the bubble at the input to gate 109 indicates an inverse condition. In this case if not in a descent mode, a logic "0" on lead 113 will drive the output of logic "OR" gate 109 and lead 107 to a logic "1" state. If lead 114 is at a logic "1" or if lead 113 is at a logic "0" state, the output of logic "OR" gate 109 will be a logic "1" supplied to lead 107. Lead 107 is supplied to reset port of Latch 105, logic "1" on lead 107 will cause the latch to be reset causing the Q output port to supply lead 104 with a logic "0". As stated above, a logic "0" on lead 104 will cause switch blade 20 to be moved to the position shown in contact with contact 18. If both lead 106 and lead 107 supply a logic "1" to their respective ports of Latch 105, the Latch is reset and a logic "0" is supplied to lead 104.

From the foregoing, it will be appreciated that the present invention provides improved automatic deceleration of the aircraft in the descent portion of the flight in the following manner:

(1) The aircraft is controlled by the computation and capture of an altitude in such a way as to provide the optimal deceleration to a commanded speed.

(2) The deceleration described above is consistent with r without an altitude restriction imposed on the deceleration.

While the invention has been described in its preferred embodiment, it is to be understood that the words which have been used are words of description rather than of limitation and that many changes or alterations may be made without departing from the true scope and spirit of the invention in its broader aspects.

I claim:

1. Deceleration control apparatus for an aircraft flight control system including servo means for controlling aircraft pitch attitude, comprising
   a. An airspeed hold subsystem for controlling said servo means,
   b. An altitude capture and hold subsystem for controlling said servo means,
   c. Means for commanding a new airspeed less than an existing commanded airspeed, said existing commanded airspeed being held by said airspeed hold subsystem, and
   d. switching means responsive to the difference between said commanded new airspeed and said existing commanded airspeed for severing said airspeed hold subsystem from control of said servo means and substituting said altitude capture and hold subsystem therefor.

2. The deceleration control apparatus as set forth in claim 1 wherein said altitude capture and hold subsystem includes means for supplying an altitude capture signal proportional to the algebraic sum of a reference aircraft altitude signal and a signal proportional to the rate of change of altitude, and an actual aircraft altitude signal wherein said switch means supplies said altitude capture signal to said servo means to flare said aircraft towards said reference altitude.

3. The deceleration control apparatus as set forth in claim 2 wherein said reference altitude signal corresponds to a synthetic altitude proportional to the sum of a signal proportional to the existing aircraft altitude and a signal proportional to the rate of change of altitude.

4. The decelertion control apparatus as set forth in claim 3 wherein said altitude capture and hold subsystem further includes latch means having an output normally synchronized with the existing altitude and altitude rate of the aircraft and means responsive to said switching means for latching the output of said latch means at the then obtaining altitude and altitude rate of said aircraft to provide said synthetic altitude signal.

5. The decelertion control apparatus as set forth in claim 4 wherein said switching means further comprises
   a. means for providing a signal corresponding to the difference between said commanded airspeed and said existing airspeed,
   b. means for providing a descent mode select signal, and
   c. first logic means responsive to said mode select signal and a value of said difference signal exceeding a predetermined value for operating said switching means.

6. The deceleration control apparatus as set forth in claim 2 further comprising
   a. means for providing a signal corresponding to the difference between the actual airspeed of the aircraft and the commanded airspeed, and
   b. means responsive to said difference signal for activating said switching means to reinstate said airspeed hold subsystem control of said servo means when the value thereof is less than a predetermined value.

7. The deceleration control apparatus as set forth in claim 6 wherein said switching means further comprises means for providing a signal corresponding to the rate of change of said existing airspeed, and second logic means responsive to said difference signal being less than a predetermined value and said airspeed rate signal being less than zero for operating said switching means to reinstate said airspeed hold subsystem operation of said servo means.

8. The deceleration control apparatus as set forth in claim 7 wherein said switching means further comprises
   a. means for providing a descent mode select signal, and
   b. third logic means responsive to said second logic means or said descent mode select signal for operating said switching means to reinstate said airspeed hold subsystem operation of said servo means.

9. Apparatus for controlling the deceleration of an aircraft from an existing commanded airspeed to newly commanded airspeed comprising
   a. means for controlling the pitch attitude of the aircraft,
   b. means responsive to the error between the actual airspeed of the aircraft and the existing commanded airspeed for controlling said pitch attitude control means to reduce said error to zero.
   c. means responsive to the error between the existing altitude of the aircraft and a reference altitude and to the exiting altitude rate of the aircraft adapted to control said pitch attitude control means,
   d. switching means responsive to the difference between the existing commanded airspeed of the aircrft and the newly commanded airspeed greater than a predetermined value for switching said pitch attitude control means from said airspeed error control to said altitude error and altitude rate control.

10. The apparatus as set forth in claim 9 wherein said altitude error and said altitude rate control is so proportioned as to cause said aircrft to asymptotically flare to said reference altitude.

11. The apparatus as set forth in claim 9 wherein said reference altitude is a synthetic altitude proportional to the sum of said existing altitude and said existing altitude rate and a proportionally constant.

12. The apparatus as set forth in claim 9 wherein said switching means comprises further means responsive to the difference between the actual airspeed and said existing commanded airspeed less than a predetermined value for switching said pitch attitude control means from said altitude error and altitude rate control back to said airspeed error control.

* * * * *